FRED W. LOY
LANE T. WELLS
INVENTORS

BY Peter J. Murphy
ATTORNEY

May 25, 1965 F. W. LOY ETAL 3,185,184
POSITIONING APPARATUS
Filed Feb. 1, 1962 10 Sheets-Sheet 2

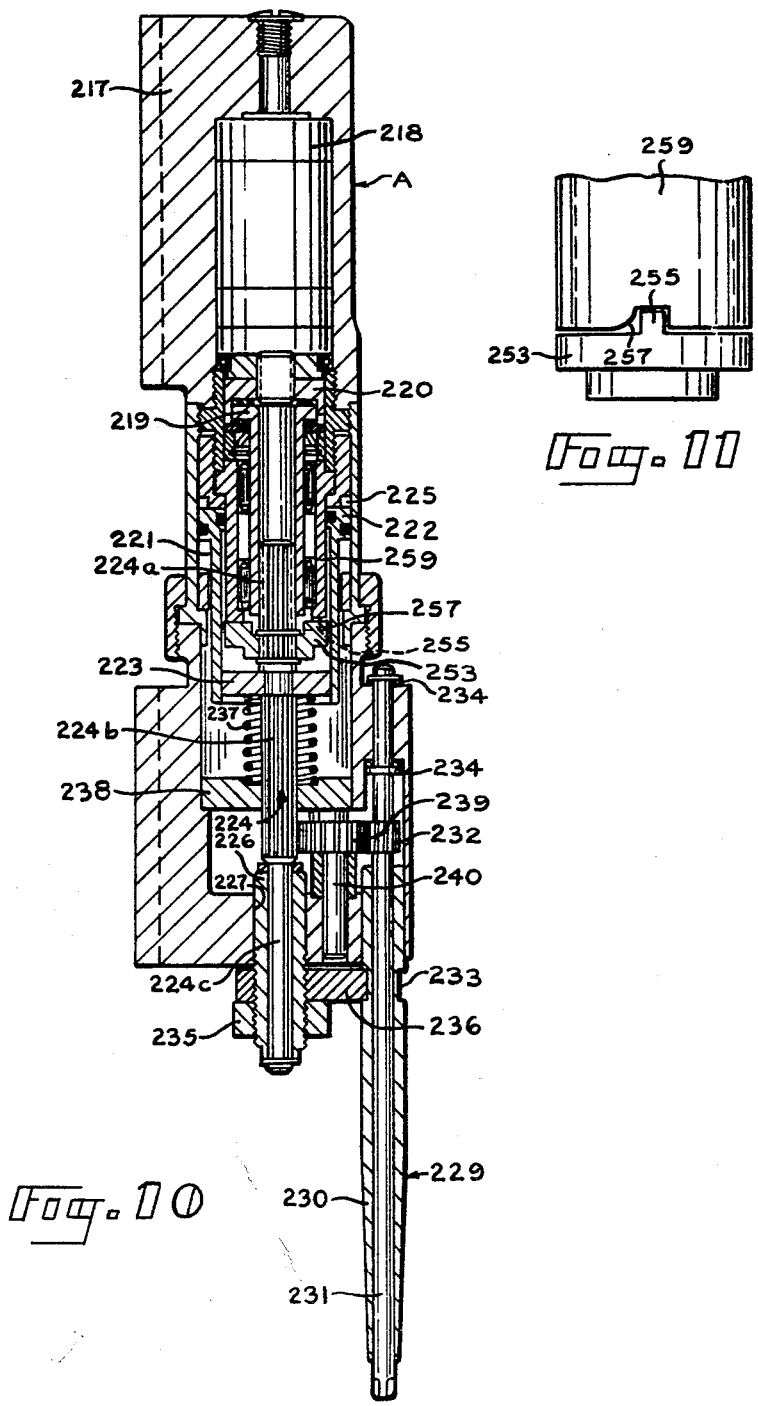

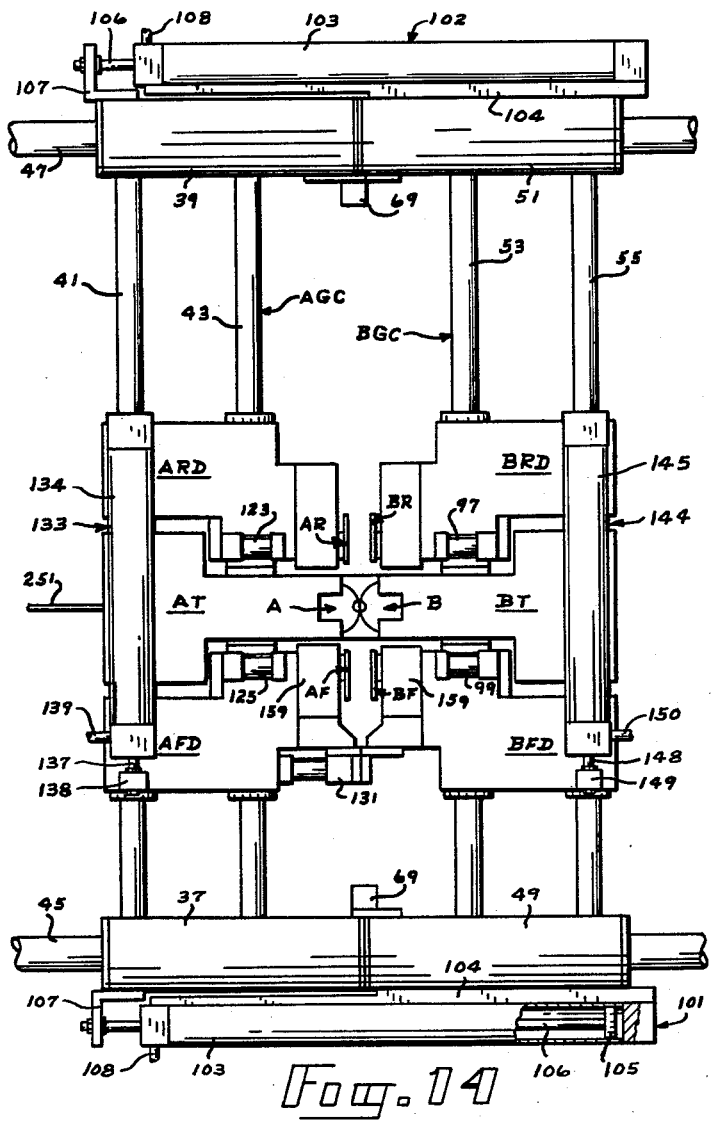

United States Patent Office 3,185,184
Patented May 25, 1965

3,185,184
POSITIONING APPARATUS
Fred W. Loy, Fruitland Township, Muskegon County, and Lane T. Wells, Grand Haven Township, Ottawa County, Mich., assignors to Gardner-Denver Company, a corporation of Delaware
Filed Feb. 1, 1962, Ser. No. 170,452
10 Claims. (Cl. 140—71)

This invention relates to apparatus for positioning working devices; and, more particularly, to apparatus for connecting wires between pairs of terminals, which are mounted in an array on a panel, including means for forming a variety of patterns of the wires.

Machines are presently known which employ two wire wrapping tools and which incorporate automatic means for making successive wire connections by wrapping the ends of successive lengths of wire around selected terminals on a panel. A "connection" is defined as the wrapping of the two ends of a length of wire on two terminals. These machines also employ dressing fingers for forming, with the tools, a predetermined pattern for the wire between the terminals. With these known machines, each connection cycle begins with the wrapping tools and dressing fingers in "home" positions, wherein the tools are adjacent to each other, and includes the following steps: feeding wire to the wrapping tools; moving the tools to positions over selected terminals; moving selected dressing fingers to form a desired wire pattern; actuating the tools to wrap the ends of the wire on the terminals; and returning the tools and dressing fingers to the home positions for the wire feeding step of the succeeding cycle.

In these machines, the above-mentioned home positions have been fixed positions relative to the panel on which the connections are made; and, for each connection cycle, the tools return to the home positions for the wire feeding step. This required movement of the tools is time-consuming, especially when successive connections are made at positions on the panel which are remote from the home positions. It is desirable to reduce these tool movements to a minimum, since unnecessary movements of the tools result in nonproductive time expended by the machine in each wrapping cycle; and this necessarily results in increased cost per connection and therefore increased cost for the wiring of a panel. Accordingly, it is a principal object of this invention to provide an improved apparatus for laying wire on a panel, which apparatus minimizes the movements of the wire laying components between successive connections.

Another object of this invention is to provide a wiring apparatus having working elements disposed in an initially grouped relation, for receiving a wire, and movable relatively to each other to lay the wire on a panel in a predetermined pattern; and including means for regrouping the elements at any selected position for the receiving of successive lengths of wire.

The novel features of the invention, as well as additional objects and advantages thereof, will be understood more fully from the following description when read in connection with the accompanying drawings, in which:

FIG. 10 is a sectional view of a wrapping tool taken along the line 10—10 of FIG. 6 looking in the direction of the appended arrows;

FIG. 11 is a fragmentary view of several elements of the tool shown in FIG. 10;

FIGS. 14, 15 and 16 are diagrammatic plan views, similar in part to FIG. 1, showing several stages of operation of the wiring apparatus.

Figure 1:
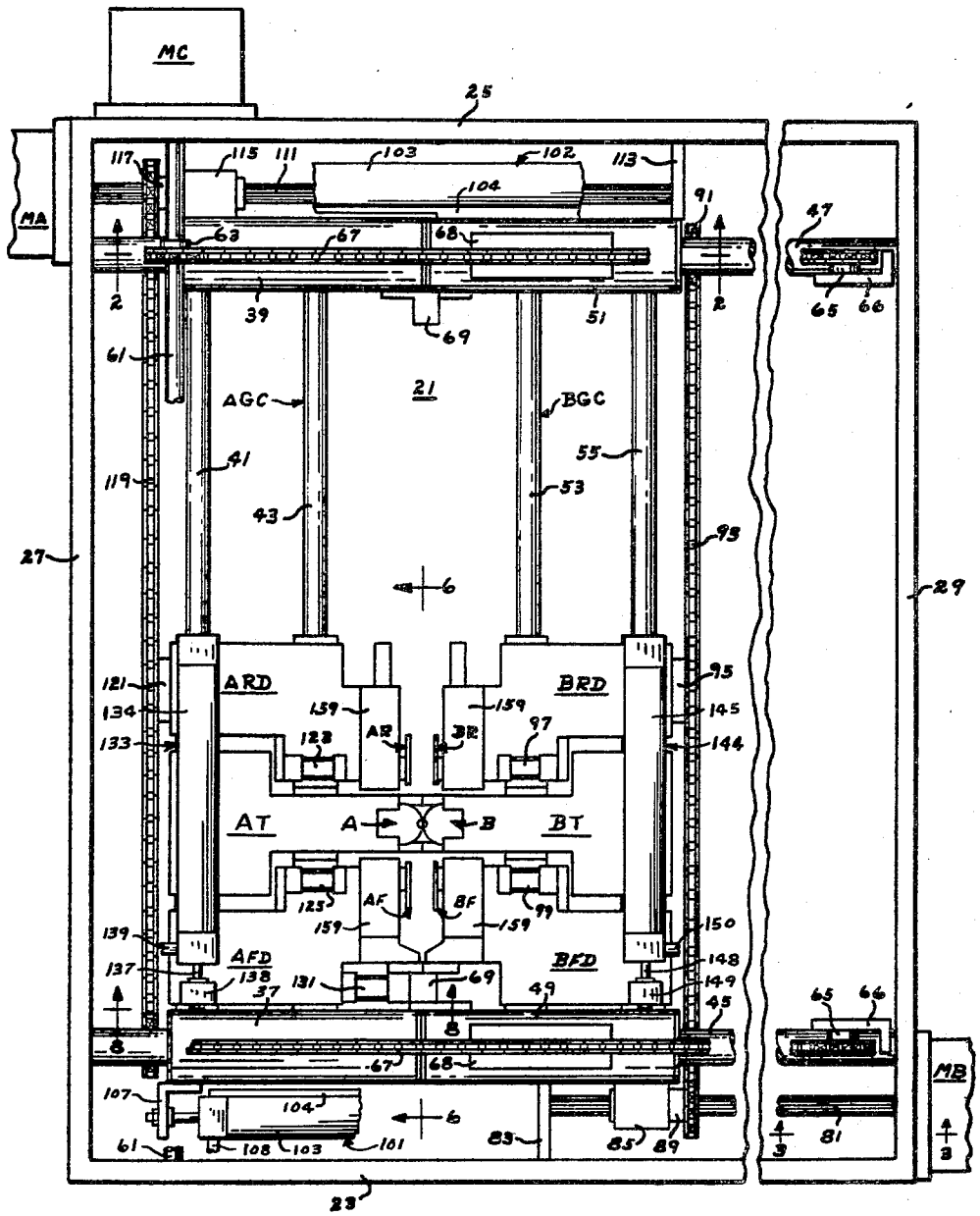
FIG. 1 is a diagrammatic top view of a wiring apparatus showing the several components in the home positions.

Referring now to the drawings, FIG. 1 is a top view of a preferred embodiment of a machine, according to the present invention, and diagrammatically illustrates the general arrangement of the major components of the machine. The front of the machine is shown at the bottom of FIG. 1. An enclosing housing for the illustrated components of the machine includes a base plate 21, a front wall 23, a rear wall 25, and side walls 27 and 29.

Figure 8:
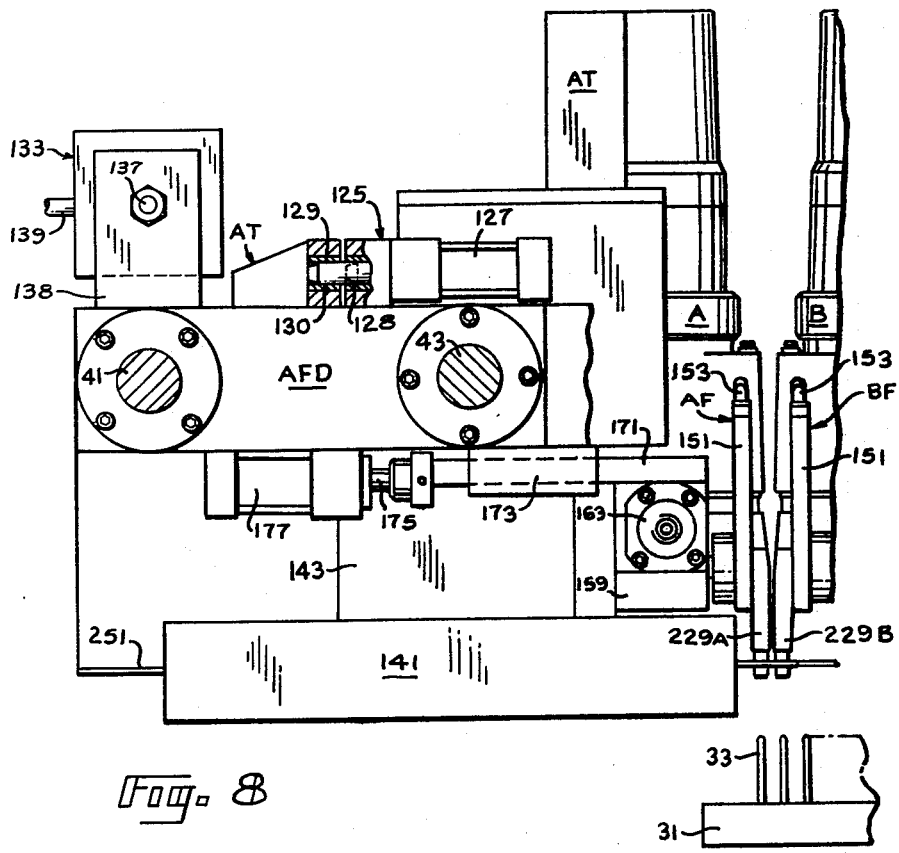
FIG. 8 is a front elevation view, partially in section, showing the relationship of the two wiring tools and associated dressing fingers.

A wiring panel 31 illustrated diagramatically in FIG. 8, is secured to a suitable fixture on the base plate 21. The panel has a plurality of perpendicularly extending terminals 33 and is disposed horizontally so that the terminals extend upward. The terminals are arranged in a coordinate grid patern defining rows of terminals. The panel is positioned with respect to the machine so that rows of terminals are defined along X coordinate axes, which are parallel to the front wall 23 of the machine; rows of terminals are defined along Y coordinate axes, which are perpendicular to the X coordinate axes and parallel to the side walls 25 and 27 of the machine; and rows of terminals are defined at angles with respect to the X and Y coordinate axes.

The wrapped connections are made by two wrapping tools A and B. These tools are moved in a horizontal plane, over the panel 31, by a mechanism to be described. Several dressing fingers AF, AR, BF and BR are also moved in a horizontal plane over the panel and cooperate with the tools A and B to define the various wire patterns which the machine is capable of producing. Examples of the variety of patterns will be referred to subsequently. The tools and dressing fingers have "home" positions which are located adjacent to the left-front corner of the machine and, correspondingly, adjacent to the left-front corner of a wiring panel 31 which is mounted in the machine. The tools and dressing fingers are shown in their home positions in FIG. 1; and, in these positions, the tools and dressing fingers are assembled in "grouped relation." Movements of the tools and dressing fingers along X coordinate axes will be termed X motion or movement in an X direction. X motion from left to right, that is movement away from the home positions, will be termed movement in a "plus X" direction; and X motion from right to left will be termed movement in a "minus X" direction. Movement of the tools and dressing fingers along Y coordinate axes will be termed Y motion or movement in a Y direction. Y motion from front to rear, that is Y motion away from the home positions, will be termed movement in a "plus Y" direction; and Y motion from rear to front will be termed movement in a "minus Y" direction. For the making of each connection, the tools and dressing fingers are moved to position the wrapping tools over preselected terminals, at predetermined XY coordinate positions, and to position certain of the dressing fingers at predetermined XY coordinate positions to define a predetermined pattern for the wire between the preselected terminals.

When the tools are in a grouped relation, the stripped leading end of a continuous length of wire is fed to and gripped by the tool B; and, subsequently, the wire is pulled by the tool B, which makes the connection further away from the home position, away from the tool A. When the tools have separated, appropriate dressing fingers engage the wire to define the predetermined pattern. The wire is then cut and stripped adjacent to the tool A; and the stripped trailing end of the wire is then gripped by the tool A. Following this, relative vertical movement between the tools and dressing fingers, on the one hand, and the panel, on the other hand, lays the wires between the rows of terminals; then the tools are actuated to wrap the ends of the wire on the terminals and the wire is released. The tool and dressing fingers are then regrouped for a succeeding cycle.

Figure 2:
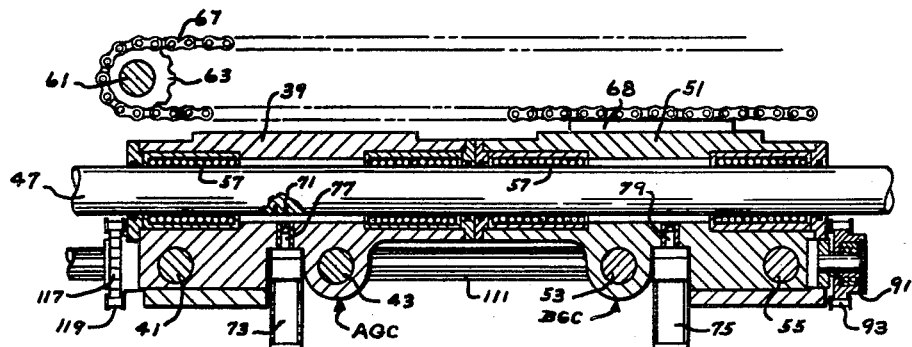
FIG. 2 is a vertical section taken along the line 2—2 of FIG. 1 looking in the direction of appended arrows.

X motion for the above-mentioned tools and dressing fingers is provided by carriers AGC and BGC. The carrier AGC comprises a forward end housing 37, a rearward end housing 39 and interconnecting slide rods 41 and 43. This carrier is supported on forward slide rod 45 and rearward slide rod 47 both of which are mounted in the side walls of the machine, parallel to the front and rear walls. The carrier AGC is disposed at the left side of the machine (as viewed in FIG. 1) and the carrier BGC is disposed at the right side of the machine and is carried on the same slide rods 45 and 47. The carrier BGC is similar in construction and comprises a forward housing 49, a rearward housing 51, and interconnecting slide rods 53 and 55. The slide rods 41, 43 and 53, 55 extend parallel to the side walls of the machine. FIG. 2 is a vertical section through the rearward slide rod 47 illustrating the bearing means 57 by which the carriers AGC and BGC are carried for free movement on the slide rods.

Y motion for the tools and dressing fingers is provided by several carriages which are mounted for movement on the slide rods of the carriers AGC and BGC. An A group of carriages, which are mounted on the slide rods 41 and 43 of the carrier AGC, includes a tool carriage AT, which carries the tool A; a rear dressing finger carriage ARD, which is rearward of the carriage AT and carries rear dressing finger AR; and a forward dressing finger carriage AFD, which is forward of the carriage AT and carries the forward dressing finger AF. Similarly, a B group of carriages includes a tool carriage BT, which carries the tool B; a rear dressing finger carriage BRD, which carries the rear dressing finger BR; and a forward dressing finger carriage BFD, which carries the forward dressing finger BF.

Figures 3, 4:
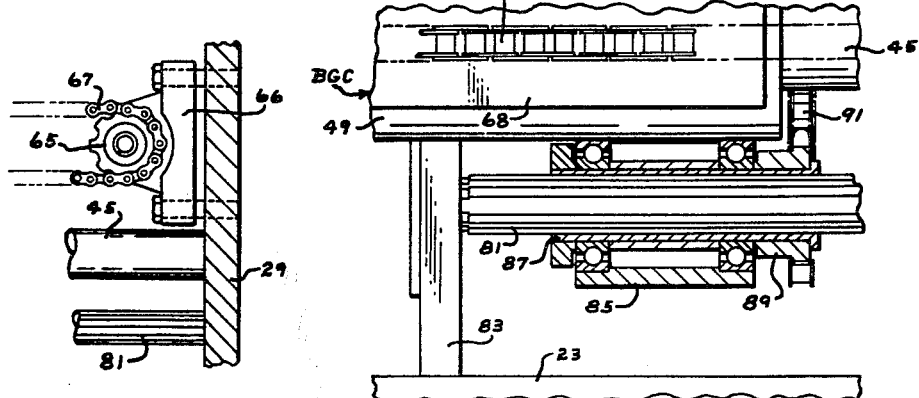
FIG. 3 is a fragmentary view taken along the line 3—3 of FIG. 1 looking in the direction of the appended arrows.
FIG. 4 is a fragmentary plan view, partially in section, of a portion of the apparatus shown in FIG. 1.

The drive means for the carriers AGC and BGC is best shown in FIGS. 1 through 3. A drive shaft 61, located at the left side of the machine, is rotatably supported in the front and rear walls 23 and 25 and is directly driven by a reversible drive motor MC, mounted outside the rear wall of the machine. This drive shaft is disposed above the carriers, as best shown in FIG. 2, and has two sprockets 63 (one not shown) nonrotatably fixed thereon and disposed above the end housings 37 and 39 of the carrier AGC. Cooperating sprockets 65 are rotatably supported in brackets 66 adjustably mounted on the right side wall 29 of the machine opposite from the sprockets 63, as best shown in FIGS. 1 and 3. Two roller chains 67, carried by the sprockets 63 and 65, pass directly over the end housings of the carriers AGC and BGC. The chains 67 are secured, respectively, to the forward and rearward end housings of the carrier BGC, by means of adjustable brackets 68, so that this carrier is directly driven in both plus X and minus X directions by the motor MC.

The carrier AGC may be coupled to the carrier BGC through selectively actuable interlocks 69, which will be described in detail subsequently. Through these interlocks, the carrier AGC is driven by the motor MC through the carrier BGC when the carriers are moved in a plus X direction. The carrier AGC is pushed by the carrier BGC, for movement in a minus X direction.

The manner in which the carriers are moved to predetermined X coordinate positions will be referred to subsequently. In general, the carriers are positioned by the motor MC and its associated controls. For accurate positioning of the carriers with respect to the slide rods 45 and 47, the slide rods are provided with spaced tapered holes 71, as shown in FIG. 2, according to the coordinate grid spacing of the machine. Each of the carrier end housings is provided with a double acting air cylinder assembly which actuates a taper pin selectively into and out of engagement with the tapered holes. After the carriers have been positioned by the motor MC, the taper pins are engaged in the holes to accurately position the carriers and hold the carriers in position, relative to the slide rods, until the wrapping cycle has been completed. In FIG. 2, the rear end housings of the carriers AGC and BGC are shown with respective taper pin assemblies 73 and 75, and respective taper pins 77 and 79.

Figure 5:
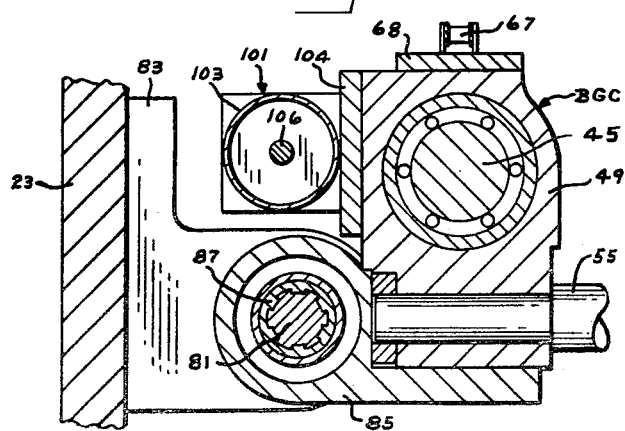
FIG. 5 is a sectional view taken along the line 5—5 of FIG. 4 looking in the direction of the appended arrows.

Separate power means are provided for moving the A group of carriages and the B group of carriages on their respective carriers AGC and BGC. The power means for the B group of carriages is best shown in FIGS. 1, 4 and 5 and includes a spline drive shaft 81 located at the front of the machine and rotatably supported in the right side wall 29 and a bracket 83, fixed to the front wall 23. The spline shaft 81 is driven by a reversible drive motor MB, mounted outside the right side wall of the machine. A bearing housing 85, mounted on the forward end housing 49 of the carrier BGC, rotatably supports an internally splined sleeve 87 having a sprocket 89 nonrotatably fixed thereto. The spline shaft 81 passes through the splined sleeve 87, driving the sleeve and sprocket. A cooperating sprocket 91 is rotatably mounted on the rear end housing 51 of the carrier BGC as best shown in FIG. 2. A roller chain 93, supported by the sprockets 89 and 91, passes along the right side of the carriages BFD, BT and BRD and is secured to the carriage BRD by means of an adjustable bracket 95. It will be seen then that the rear dressing finger carriage BRD is directly driven, in both plus Y and minus Y directions on the slide rods 53 and 55 of the carrier BGC, by the drive motor MB. A selectively actuable interlock 97 is provided for coupling the tool carriage BT to the carriage BRD. Another selectively actuable interlock 99 is provided for coupling the forward dressing finger carriage BFD to the carriage BT. It will now be seen that the carriage BRD is the only carriage which is directly driven by the motor MB, and that the carriages BT and BFD are driven in a plus Y direction through the carriage BRD, in accordance with the selected conditions of the interlocks 97 and 99. The carriages BT and BFD are pushed by the carriage BRD for movement in a minus Y direction.

The A group of carriages is powered in a similar manner by a reversible drive motor MA driving a spline drive shaft 111, rotatably supported in the left side wall 27 and a bracket 113, fixed to the rear wall 25 of the machine. A bearing housing 115, mounted on the rear end housing 39 of the carrier AGC, rotatably supports a splined sleeve carrying nonrotatably fixed sprocket 117. A roller chain 119 is carried by the sprocket 117 and a cooperating sprocket (not shown), which is mounted on the forward end housing 37 of the carrier AGC. This chain is connected to the rear dressing finger carriage ARD by means of an adjustable bracket 121, so that this carriage is directly driven, in both plus Y and minus Y directions, by the drive motor MA. An interlock 123 couples the tool carriage AT to the carriage ARD, and an interlock 125 couples the forward dressing finger carriage AFD to the carriage AT. Here again, only the carriage ARD is driven directly by the motor MA and the carriages AT and AFD are selectively driven, in the plus Y direction, through the interlocks 123 and 125. The carriages AT and AFD are pushed by the carriage ARD for movement in the minus Y direction.

The interlock 125, which couples the tool carriage AT and the forward dressing finger carriage AFD, is best shown in FIG. 8. This interlock includes a double-acting air cylinder assembly 127, which is fixed to the carriage AFD and which directly reciprocates a shot pin 129. This shot pin reciprocates in a bushing 128 mounted in the cylinder assembly and in a bushing 130 mounted in a portion of the carriage AT. When the shot pin 129 is extended, as shown in FIG. 8, the carriage AFD is coupled to the carriage AT and will be moved in a Y direction along with the carriage AT. If the shot pin is retracted, as shown by the dotted lines, the carriage AFD may be locked in position, on the carrier AGC, and the carriage AT moved to a different Y coordinate position.

All of the above-mentioned interlocks 69, 97, 99, 123 and 125 are similar in structure to the interlock 125. An additional interlock 131, of similar structure as best shown in FIG. 14, is provided to couple the carriages AFD and BFD together. This interlock is engaged only when all of the above-mentioned interlocks are also engaged and the carriers and carriages are in grouped relation, and therefore locks the A group and B group of carriages together to coordinate Y movements of the A group and B group of carriages. When it is intended to move the A group and the B group of carriages together in a Y direction, both the motors MA and MB are actuated. Since these motors are independent, relative Y movement may occur between the groups, and hence between the tools A and B, and this may result in some undesirable withdrawing of wire by the tool B with respect to the tool A. The interlock 131 is provided, therefor, to maintain the tools A and B adjacent each other even though they are driven in a Y direction by independent drive motors.

The slide rods 41 and 55 of the carriers AGC and BGC respectively are provided, on the undersides, with tapered holes similar to the tapered holes 71 provided in the slide rods 45 and 47. Each of the carriages AFD, AT, ARD, BFD, BT and BRD is provided with a taper pin assembly, similar to those described for the carriers AGC and BGC, for engaging the tapered holes in the respective slide rods. These are provided for accurately positioning and locking the individual carriages, in a manner similar to that described for the carriers, after the carriages have been positioned by their respective drive motors.

The motors MC, MB and MA are similar and may be of any known type, actuated electrically, hydraulically, or pneumatically for example. These motors are reversible and are susceptible to being controlled, by a suitable control means, for accurately positioning the driven members.

At the end of each connection cycle, after the wire has been wrapped on the selected terminals and the tools and dressing fingers are disengaged from the wire, the carriers and carriages are regrouped in order to: position the two carriers adjacent to each other; to position the carriages of the A group adjacent to each other; to position the carriages of the B group adjacent to each other; and to align the A and B groups of carriages in a Y direction so that the tools A and B are positioned adjacent to each other for the feeding of the wire to the tool B. As above stated, this regrouping may be done by returning the carriers and carriages to the home positions as shown in FIG. 1. According to the present invention, however, this may be accomplished by moving the driven carriers and carriages to any selected positions relative to the panel, which will be referred to as a "starting" position, and by actuating regrouping air cylinder assemblies which will now be described.

For regrouping the carriers AGC and BGC, a cylinder assembly 101 is connected between the carrier forward end housings 37 and 49 and a cylinder assembly 102 is connected between the carrier rearward end housings 39 and 51. These cylinder assemblies are identical and are best shown in FIG. 14, being partially shown in FIG. 1 and other figures. Referring to the cylinder assembly 101, this assembly includes a cylinder 103, mounted on the forward end housing 49 of the carrier BGC by means of a bracket 104. A piston 105 is secured to a piston rod 106 which extends through one end of the cylinder 103 and is secured to a bracket 107 which is mounted on the forward end housing 37 of the carrier AGC. An air conduit 108 communicates the end of the cylinder, adjacent to the bracket 107, with an air control valve, for example. The opposite end of the cylinder is vented.

A similar cylinder assembly 133 is provided for regrouping the carriages ARD, AT and AFD. This assembly is connected between the dressing finger carriages ARD and AFD, and includes a cylinder 134 mounted on the carriage ARD by means of a bracket 135. A piston rod 137, connected to a piston enclosed in the cylinder, extends from the forward end of the cylinder and is secured to a bracket 138 mounted on the dressing finger carriage AFD. A conduit 139 communicates the forward end of the cylinder assembly with an air control valve, for example. The opposite end of the cylinder is vented.

A cylinder assembly 144 extends between the dressing finger carriages BRD and BFD and includes a cylinder 145 mounted on the carriage BRD by means of a bracket 146. A piston rod 148, connected to a piston within the cylinder, extends from the forward end of the cylinder and is secured to the carriage BFD by means of a bracket 149. A conduit 150 communicates the forward end of the cylinder with an air control valve, for example. The opposite end of the cylinder is vented.

The cylinder assemblies 133 and 144 are not connected with the respective carriages AT and BT; however, these carriages are positioned by the collapsing of the regrouping cylinder assemblies. The operation of all of the above regrouping assemblies will be discussed subsequently in connection with a description of an operating cycle.

Figure 6:
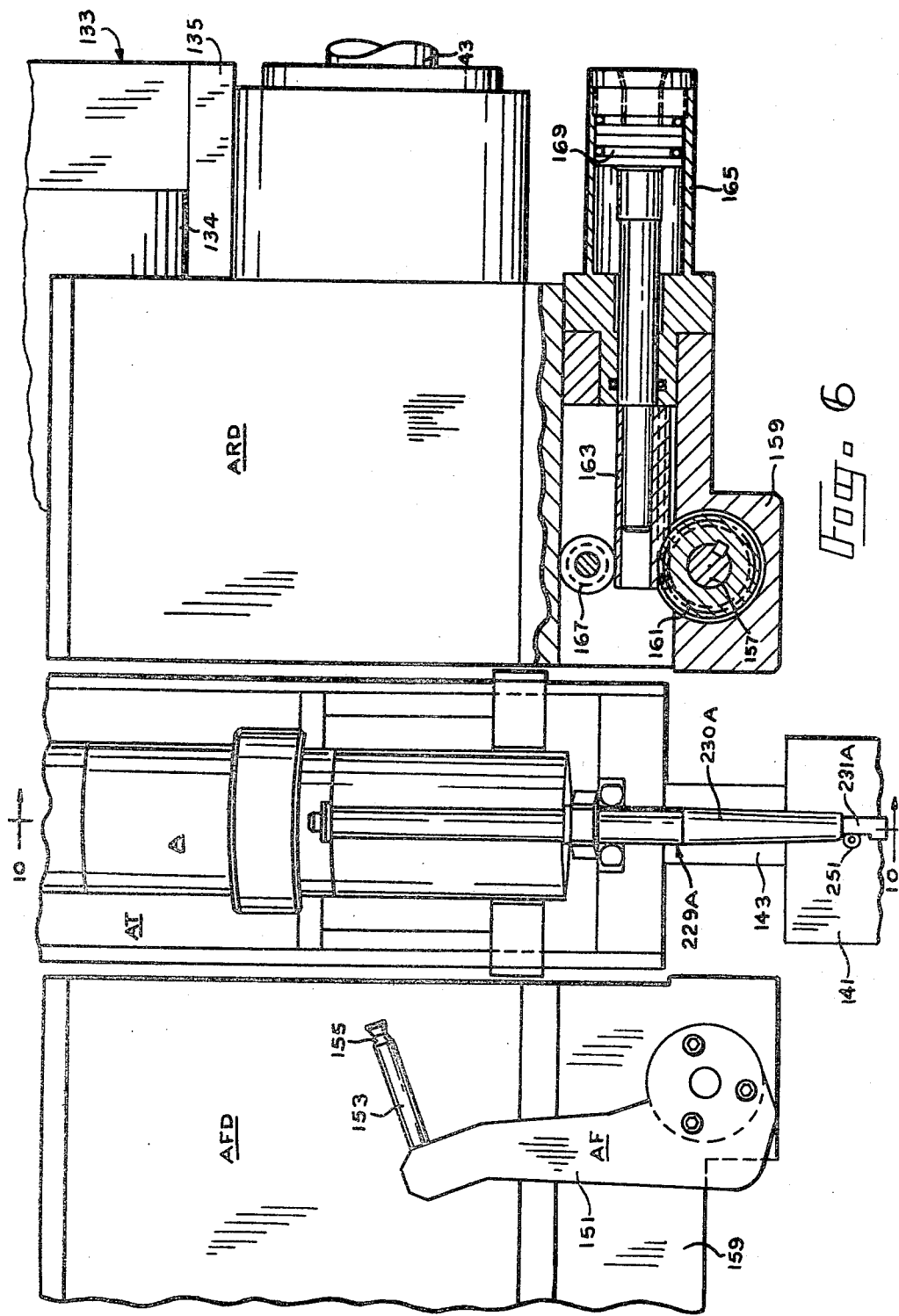
FIG. 6 is an elevation view taken along the line 6—6 of FIG. 1, looking in the direction of the appended arrows, and showing the relationship of a tool carriage and associated dressing finger carriages.

The wire wrapping tools A and B, which are carried by respective carriages AT and BT, are particularly shown in FIGS. 6 and 8 in their relation to each other and to the other components of the machine in a grouped relation. The structure of the tool A and its associated bit are particularly shown in FIG. 10 and associated FIGS. 11 through 13. The A and B tools are identical in structure except that they are designed to drive respective bits in opposite directions of rotation. Where applicable, certain elements of the tool A are identified and illustrated by reference numerals with the subscript A, and identical elements for the tool B are identified by the same reference numerals with the subscript B.

Referring now particularly to FIGS. 10 and 11, the tool comprises a generally cylindrical elongated housing having a longitudinal dove tail 217, in two aligned sections, for engagement with a dove tail clamp of the carriage AT for the purpose of supporting the tool. The housing encloses a rotary vane air motor 218 at its upper end, the motor driving an internally splined drive shaft 219 through a friction clutch 220. A sleeve 221, having an integral annular piston 222 at its upper end, is confined within an annular cylinder chamber 225 defined by the tool housing. A washer 223, having a radial slot, is fixed to the lower end of the sleeve 221. A shaft 224 includes an upper spline portion 224a, received within the splined drive shaft 219 and driven thereby; an intermediate elongated gear portion 224b; and a lower journal portion 224c. An annular groove provided between the spline and gear portions is received within the radial slot of the washer 223. A sleeve bushing 226, axially fixed to the journal portion of the shaft 224 in a manner to permit rotation of the shaft within the bushing, is mounted for axial sliding movement through an opening 227 in the lower end of the tool housing.

The tool element which performs the wrapping operation is a bit 229 comprising a sleeve 230 partially enclosing bit member 231. The bit member and sleeve are coupled by a pin and slot arrangement which permits longitudinal movement of the sleeve with respect to the bit member, and by which the sleeve is rotated with the bit member. The bit member 231 includes an integral gear 232 adjacent to its upper end. The sleeve 230 is rotatably mounted in the tool housing, in suitable bores parallel to the shaft 224 and adjacent to the housing periphery, in a manner permitting axial movement. The bit member is retained for rotation with respect to the housing by snap rings 234, in a manner to prevent axial movement. The sleeve is provided with an annular groove 233 intermediate its ends. A transverse foot member 236 is threaded onto the lower end of the sleeve bushing 226 and secured by a lock nut 235. The foot member is bifurcated defining a fork which receives, and which is received in, the annular groove 233 of the sleeve 230. It will now be seen that axial movement of the sleeve 230 is controlled by the piston 222 through the washer 223, the shaft 224, the sleeve bushing 226, and the foot member 236. A coil spring 237 is confined between the washer 223 and a transverse housing wall 238 to bias the washer, the bit sleeve, and the piston 222, to an uppermost position as shown in FIG. 10. Air admitted to the chamber 225 above piston 222 moves these members downward. An idler gear 239, rotatably mounted on a shaft 240 couples the gear portion 224b of the shaft 224 and the bit gear 232. It will now be seen that the bit 229 is rotated by the motor 218 through the drive shaft 219, the shaft 224, and the idler gear 239.

In FIG. 10, the bit sleeve 230 is shown in its uppermost position with respect to bit member 231. This is a normal "open" condition of the bit in which a wire may be fed transversely across the bit adjacent to the exposed lower end of the bit member 231. Details of the lower end of the bit 229 are particularly shown in FIGS. 12 and 13. The lower end of a bit member 231 is provided with a transverse flat, spaced rearwardly from the lower end of the bit member, defining a longitudinal guide surface 243, and a transverse surface 245 at the forward end of the surface 243 disposed substantially parallel with the end face of the bit member. A conventional opening (not shown), for receiving the terminal, is provided in the end of the bit member, and the end face of the bit member is provided with a suitable configuration for effecting the wrapped connection. A wire receiving groove 247 is provided longitudinally on the periphery of te bit member and extends between the end face and the transverse surface 245, merging with the guide surface 243. The sleeve 230 is generally cylindrical and is provided with a longitudinal slot 249, which cooperates with the guide surface 243 of the bit member to receive the wire, as will be described.

Figure 12:
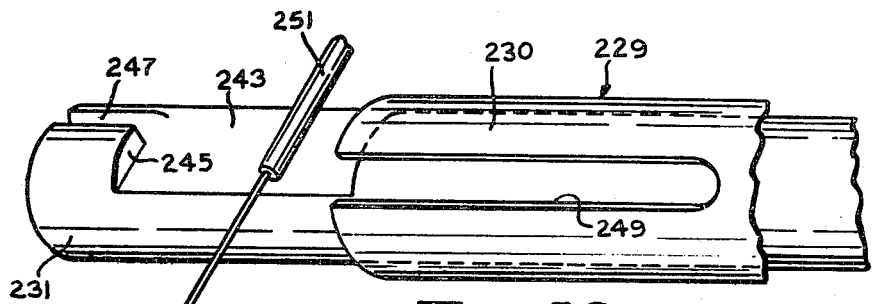
FIGS. 12 and 13 are fragmentary views of a tool wrapping bit.
Figure 13:
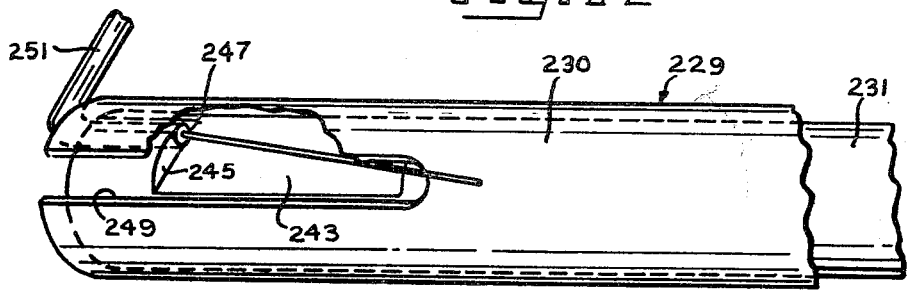

FIG. 12 shows the bit in the above-described open condition, and also shows the stripped end of a wire 251 positioned on the guide surface 243. The bit is now in condition to be "closed," as shown in FIG. 13. This is accomplished by introducing air to the cylinder 225 above the piston 222 as described above. As the sleeve 230 moves over the bit member 231, the wire 251 is contacted by the lower end of the sleeve and urged toward the transverse surface 245. As this movement continues, the wire engages the rearward end of the wire receiving groove 247 and the opposing forces cause the wires to be bent and to be laid into the wire groove 247 as shown in FIG. 13, and the wire is now gripped by the bit. The free end of the wire may extend through the slot 249 in the sleeve, as shown. The wire is now in condition to be wrapped on a terminal.

In a wire wrapping tool as above described, it is essential that the bit always be stopped or indexed in the same rotational position with respect to the tool, since the wire is to be fed across and adjacent to the longitudinal guide surface 243, as above described. FIG. 11 is an enlarged fragmentary view of a portion of the tool indexing mechanism. A collar 253, having an upwardly extending dog 255, is nonrotatably fixed to the spline portion 224a of the shaft 224 just above the washer 223, by means of snap rings for example. This dog engages a slot 257 in the tool housing member 259, when the shaft 224 is in its uppermost position. In the cycle of operation the bit is first closed, effecting disengagement of the dog 255 from the slot 257, and this permits the motor 218 to rotate the bit when air is directed to the motor. The bit is opened before the motor is stopped, the spring 237 effecting movement of the collar 253 upward to permit the dog 255 to find and engage the slot 257 and stop rotation of the shaft 224 and the bit 229. The bit is then indexed in the proper rotational postion. The friction clutch 220 permits rotation of the motor with respect to the drive shaft 219 and the gear shaft 224, after the dog engages the slot.

In FIG. 8, which is an elevation view from the front of the machine, the relation of the tools A and B and the bits 229A and 229B are shown in a grouped relation wherein the bits are adjacent to each other in a plane parallel to the front wall 23 of the machine. In this figure there is also shown a stripping and feeding assembly, indicated by a housing 141, which is secured beneath the carriage AT by a bracket 143. This stripping and feeding assembly may be similar to an assembly shown in Bach et al. Patent 2,886,995, issued May 19, 1959, and which functions in a manner shown diagrammatically in FIGS. 9 through 15 of that patent. This device would handle a continuous length of wire 251 which is drawn from a suitable supply reel into the left end of the assembly 141, as shown in FIG. 8. The assembly automatically cuts the wire and strips the insulation from the wire for a predetermined length at each side of the cut. In a connection cycle, the cutting and stripping of the wire is done, when the tools are positioned over selected terminals, the tool B having drawn the necessary length of wire relative to the tool A. When the cutting and stripping of the wire is accomplished, the trailing end of the severed portion of the wire is gripped by the tool A, by closing the bit 229A for example, and the severed portion of the wire is then connected to the wiring panel. When the carriages are returned to a grouped relation, the assembly feeds the stripped leading end of the continuous wire past the tool A to the tool B where it is clamped, by closing the bit 229B for example. In FIG. 8, the leading end of the wire is shown in position to be clamped by the tool B.

FIG. 6 is a side elevation view, partially in section, which shows the relation of the carriages AFD, AT and ARD in a grouped relation. As viewed in this figure, the wire stripping and feeding assembly 141 would feed the wire directly out of the paper.

Figure 7:
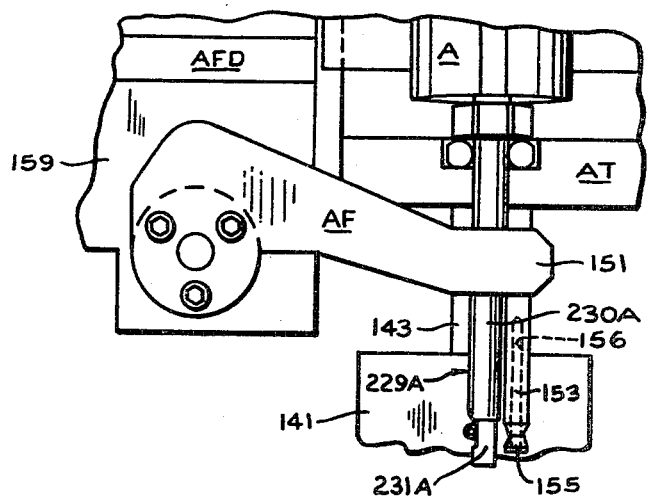
FIG. 7 is a fragmentary elevational view, relating to FIG. 6, showing a dressing finger in wire engaging position.

FIGS. 6 and 7 particularly illustrate the relation of the dressing finger AF and AR in relation to the wrapping bit 229A. The dressing finger AR (not shown) is identical to the dressing finger AF, but in an opposed position. Until the dressing fingers are moved into position to engage the wire, the dressing fingers are retained in an upper or "cocked" position as shown by the dressing finger AF in FIG. 6. When the dressing finger is moved to wire engaging position, it is rotated downward to the position shown in FIG. 7.

The dressing fingers AF, AR, BF and BR are identical. Each consists of an arm 151 having a fixed finger 153 provided with a defined annular groove 155 at its tip to engage the wire. The arm is secured to a collar which is keyed to a shaft 157 which is rotatably supported, and extends from, a dressing finger housing 159. Within the housing 159, a gear 161 is fixed to the shaft 157 and is engaged by a rack 163 fixed to the plunger of a double-acting air cylinder assembly 165. A roller 167 maintains the rack in engagement with the gear 161. The air cylinder assembly 165 includes a piston 169 having an integral plunger which extends from the assembly and has the rack 163 attached. It will be seen then that the dressing finger is selectively rotated between the cocked position and the wire engaging position by the air cylinder assembly 165.

Figure 9:
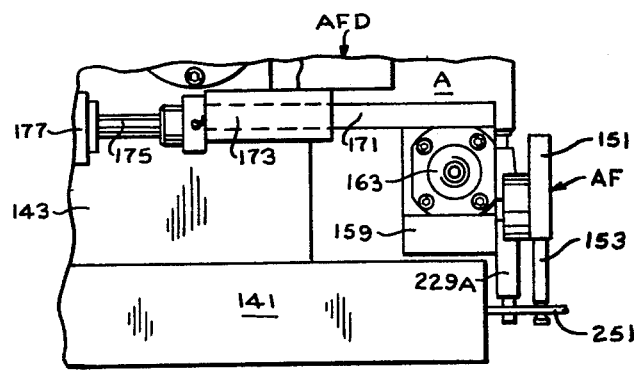
FIG. 9 is a fragmentary view, relating to FIG. 8, showing a dressing finger in wire engaging position in relation to a tool bit.
Figure 15:
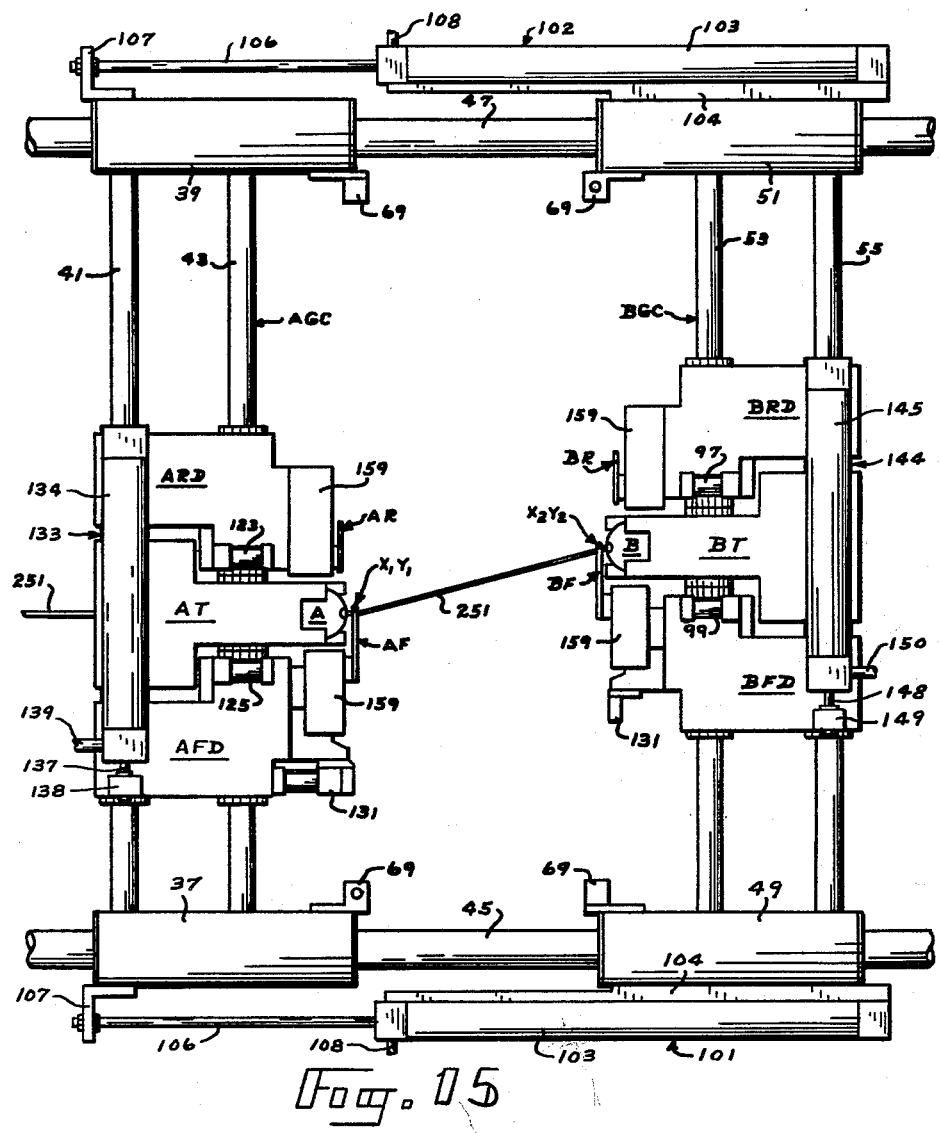

The necessity for rotating the dressing finger is apparent from FIG. 7 wherein it is noted that, in the wire engaging position, the finger 153 of the dressing finger AF, which is mounted forwardly of the bit 229A, is positioned to the rear of the bit to engage the rearward side of the wire for the purpose of drawing the wire forward with respect to the bit. Similarly, the rear dressing finger AR is mounted rearwardly of the bit 229A and its finger 153 is positioned to engage the forward side of the wire to pull the wire rearward. It is also to be noted, from FIGS. 8 and 9, that when the dressing fingers are in wire engaging position they must lie outside of the bits; and they cannot be retained in these positions when the two bits are adjacent to each other as shown in FIG. 8. In FIG. 8, then, the dressing fingers AF and BF are shown in their cocked positions. Before the dressing fingers may be rotated to the wire engaging positions, each dressing finger must be moved outwardly with respect to its carriage as shown in FIG. 9. The means for accomplishing this is best shown in FIGS. 8 and 9 wherein the housing 159, for the dressing finger AF, is mounted on a slide 171 which is reciprocated within a bracket 173 mounted on the underside of the carriage AFD. The slide 171 is coupled to the plunger 175 of a double-acting air cylinder assembly 177, which is also mounted on the carriage AFD. The air cylinder assembly is similar in structure to the assembly 165 for rotating the dressing finger. FIGS. 7 and 9 particularly illustrate the relation of the dressing finger AF to its associated bit 229A, when the dressing finger is moved outwardly and rotated to the wire engaging position.

In FIG. 8, a portion of a wiring panel 31 is shown in its relation to the tools, dressing fingers and associated carriages. The vertical relation, such as is shown, is maintained while the wire is formed in a predetermined pattern as will be described. After the wire pattern is formed, the wire cut and stripped adjacent to the tool A, and the severed portion of the wire gripped by the tools A and B, the tools and dressing fingers must be moved, relatively, toward the panels and over the terminals. This is preferably accomplished, through means not shown, by moving the dressing fingers and tools down to the panel. The fingers 153 of each dressing finger are provided with axial openings 156 extending from the ends thereof to receive terminals, in the event that the fingers are positioned over a terminal.

It will be apparent from the foregoing description that a machine embodying the above-described apparatus is preferably operated by air. The drive motors MA, MB and MC are preferably controlled by a suitable electric programming circuit which receive XY coordinate information, either from an operator through a control panel or from an automatic device such as a tape reader, and actuates the motors to position the carriers and carriages accordingly. The same programming circuit may program and control other functions of the machine, namely those controlled by the above described air cylinder assemblies, through a suitable pneumatic circuit. Since the control means is not a part of the present invention, these are not described herein.

Figure 16:
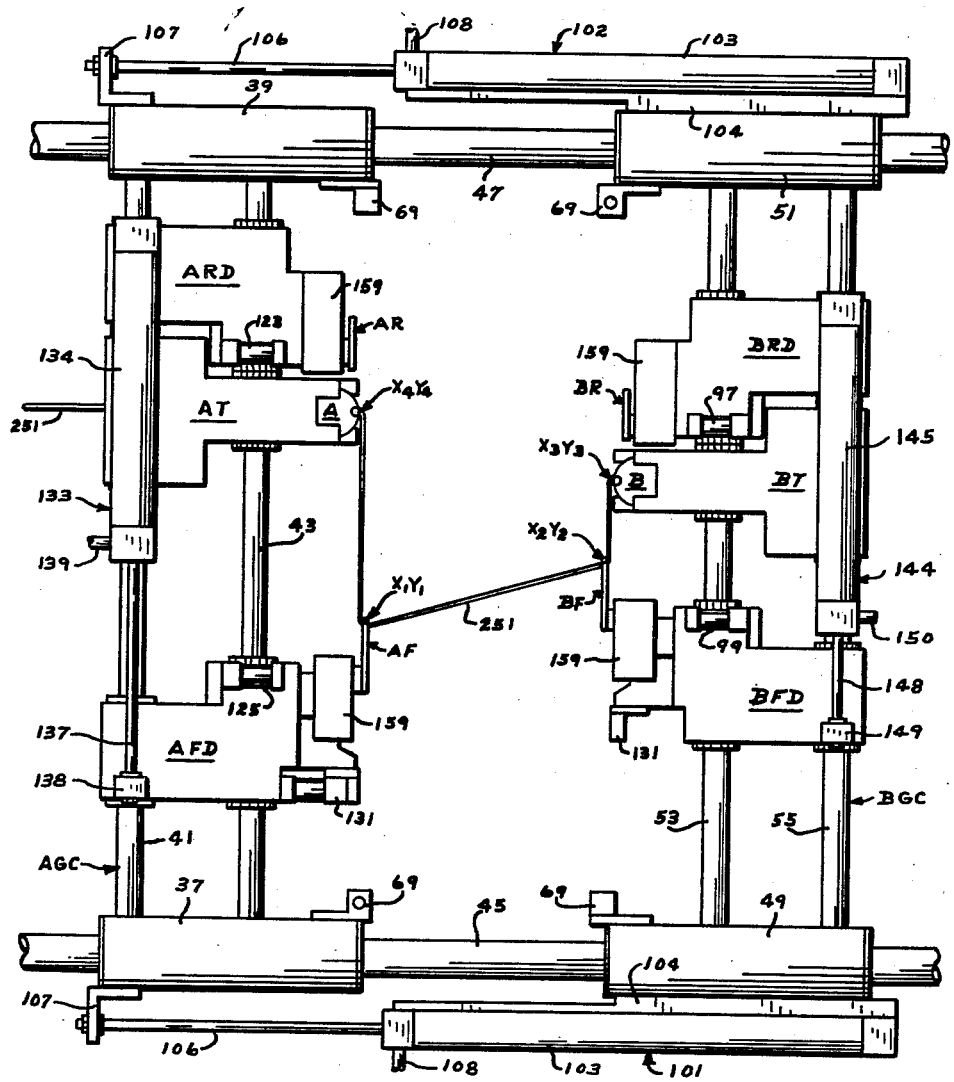

An operating cycle for the above-described machine will now be described with particular reference to FIGS. 1, 14, 15 and 16. The cycle to be described produces a U-shaped pattern of the wire 251 as shown in FIG. 16. At the beginning of the described operating cycle, the carriers AGC and BGC and the carriages AFD, AT, ARD, BFD, BT and BRD are all in their respective home positions, in a grouped relation, as shown in FIG. 1. All of the dressing fingers AF, AR, BF and BR are in the cocked positions. All of the interlocks 69, 97, 99, 123, 125 and 131 are engaged; therefore, carrier AGC is coupled to the carrier BGC; the carriages AT and AFD are coupled to the carriage ARD; the carriages BT and BFD are coupled to the carriage BRD; and the carriages AFD and BFD are coupled together to couple the A and B groups of carriages together. The stripped, leading end of a continuous wire 251 is fed to the tool B and is clamped by the tool B, by closing its bit 229B for example.

To produce the pattern shown in FIG. 16, the dressing finger carriage AFD must first be moved to a predetermined coordinate position X1, Y1, which is determined by the position of the finger 153 of the dressing finger AF when it is in wire engaging position. For this particular pattern, this is the lowest X and lowest Y coordinate position relative to the home position; and will be referred to as the "starting" position. Accordingly, the motor MC is actuated to move both carriers in a plus X direction to the coordinate position X1; and the motors MA and MB are actuated to move the A group and B group of carriages in a plus Y direction to the coordinate position Y1. These X and Y movements may occur simultaneously. FIG. 14 shows the positions of the carriers and carriages when the dressing finger AF has been positioned at the coordinate position X1, Y1. The carriers and carriages are still in a grouped condition and are now in the starting position. The taper pin assemblies 73 of the carrier AGC are now actuated to accurately position and lock this carrier with respect to the slide rods 45 and 47. The taper pin assembly of the carriage AFD is also actuated to accurately position and lock this carriage with respect to the slide rod 41.

The next step in the cycle is to position the carriage BFD at a coordinate position X2, Y2, which is determined by the position of the finger 153 of dressing finger BF in the wire engaging position. To accomplish this the interlocks 69, between the carriers AGC and BGC, and the interlock 131, between carriages AFD and BFD are disengaged. The carrier BGC is then moved in a plus X direction away from the carrier AGC, to the coordinate position X2, by the motor MC; and the B group of carriages is moved in a plus Y direction to the coordinate position Y2, by the motor MB. Again, these X and Y movements may occur simultaneously. Each of the A group of carriages and the B group of carriages remain in a grouped condition. During these movements, the wire 251 is drawn by the tool B through the wire stripping and feeding assembly 141. Also, during these movements, the cylinder assemblies 101 and 102 have been extended due to the separation of the carriers, both ends of each cylinder being vented to permit this extension. The taper pin assemblies 75 of the carrier BGC are now actuated to accurately position and lock this carrier with respect to the slide rods 45 and 47. The taper pin assembly for the carriage BFD is also actuated to accurately position and lock this carriage with respect to the slide rod 55 of the carrier BGC. The dressing fingers AF and BF are now moved to wire engaging positions and engage the rearward side of the wire 251, at coordinate positions X1, Y1 and X2, Y2, respectively. The carriers and carriages are now in the positions shown in FIG. 15.

The next step in the cycle is to position the tool B at a coordinate position X3, Y3. The X coordinate position has already been fixed by the previous X movement of the carrier BGC. The interlock 99, between the carriages BT and BFD is now disengaged and the motor MB is actuated to move the carriages BRD and BT in a plus Y direction to the coordinate position Y3. During this movement the wire 251 is drawn by the tool B around the dressing finger BF to form the lower right-hand corner of the U-shaped pattern as shown in FIG. 16. Also, during this movement, the cylinder assembly 144 is extended due to the separation of the carriages BRD and BFD, both ends of the cylinder 145 being vented to permit this extension. The taper pin assembly of the carriage BT is then actuated to accurately position and lock this carriage with respect to the slide rod 55 of the carrier BGC.

The other leg of the U-shaped pattern is then formed by disengaging the interlock 125 between the carriages AT and AFD and actuating the motor MA to move the carriages ARD and AT in a plus X direction to position the tool A at the coordinate position Y4. The coordinate position X4 had been determined by the initial X movement of the carrier AGC. During this movement, the cylinder assembly 133 is extended due to the separation of the carriage ARD and AFD, both ends of the cylinder 134 being vented to permit this extension. The taper pin assembly of the carriage AT is then actuated to accurately position and lock the carriage AT with respect to the slide rod 41 of the carrier AGC. The wire stripping and feeding assembly 141 is then actuated to cut and strip the wire adjacent to the tool A and the wire is clamped by the tool A, by closing its bit 229A for example.

The pattern is now completed, as shown in FIG. 16, to connect the wire 251 between terminals 33 located at coordinate positions X3, Y3 and X4, Y4, and to lay the wire between selected rows of terminals. The tools A and B are then actuated to wrap the ends of the severed portions of the wire 251 on the respective terminals. To complete the cycle, the taper pins are disengaged from respective slide rods, the dressing fingers AF and BF are returned to the cocked positions, and the motors MA, MB and MC are actuated to position the carriers and carriages at a "starting" position for the succeeding connection cycle. This starting position may be any position relative to the panel; and the carriers and carriages are regrouped to the relation shown in FIG. 14. The regrouping is accomplished by directing air to the cylinders 103, 134 and 145, through respective conduits 108, 139 and 150, to collapse the cylinder assemblies as shown in FIG. 14. The starting position is determined by the lowest X and lowest Y coordinate poistions for the pattern to be made. For the above-described U-shaped pattern, the lowest X and the lowest Y coordinate positions were determined by the position of the dressing finger AF. The lowest coordinate positions for other patterns will be referred to subsequently.

The motors may move the directly driven carrier BGC and carriages ARD and BRD in either plus or minus directions to the selected starting position; and the cylinder assemblies may be collapsed simultaneously. At the new starting position, all of the above-mentioned interlocks are engaged to hold the carriers and carriages in grouped relationship for the wire feeding step, and all of the cylinder assemblies are vented. A succeeding connection cycle is then made, in a manner similar to that described, except that the movements from the "home" positions to the "starting" positions are eliminated.

Figure 17:
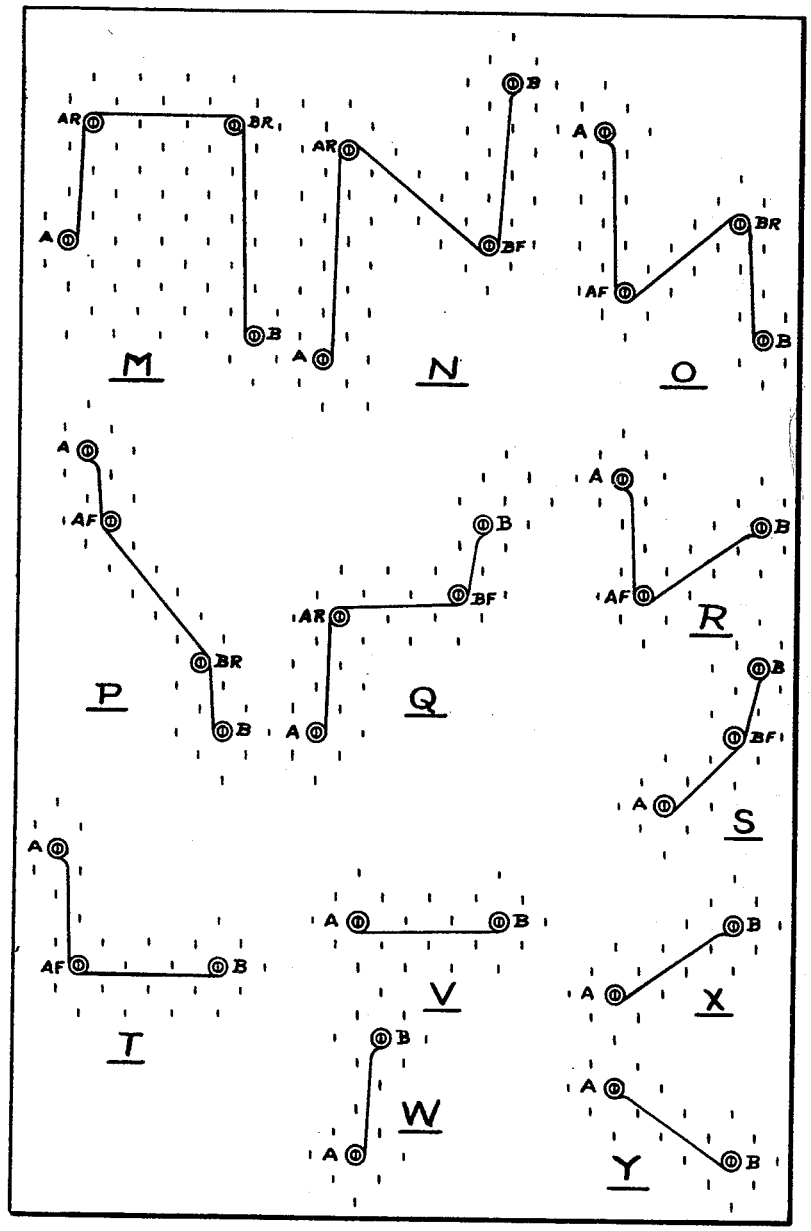
FIG. 17 is a diagrammatic view of a wiring panel illustrating several wiring patterns which apparatus according to the present invention is capable of making.

It is to be noted that the dressing fingers AR and BR do not participate in the formation of the above-described U-shaped pattern. FIG. 17 shows examples of other patterns which may be formed by the above-described apparatus. Pattern M, for example, is an inverted U and is formed by the tools A and B along with the dressing fingers AR and BR. The dressing fingers AF and BF do not participate in the formation of this pattern. For this pattern, the lowest X coordinate position is determined by the tool A and the lowest Y coordinate position is determined by the tool B; and these coordinate positions determine the starting position for this particular pattern. To form this pattern, the carrier BGC is first moved in a plus X direction to move the tool B from the starting position to the position shown; the A group of carriages are then moved in a plus Y direction to move the tool A from the starting position to the position shown; the dressing finger carriage BRD is then moved in a plus Y direction to position the dressing finger BR at the position shown; and the dressing finger carriage ARD is then moved in a plus Y direction to position the dressing finger AR at the position shown.

Patterns N, O, P and Q are Z-shaped patterns. Pattern N, for example, is formed by the tools A and B along with the dressing fingers AR and BF. For this pattern, both the lowest X and lowest Y coordinate positions are determined by the tool A, which determines the starting position for this pattern. To form this pattern, the dressing finger carriage BFD is moved both plus X and plus Y to move the dressing finger BF from the starting position to the position shown; the carriage BT is then moved plus Y to move the tool B to the position shown; and the carriage ARD is moved plus Y to move the dressing finger AR from the starting position to the position shown. Patterns O, P and Q are formed by the tools and dressing fingers as shown on the drawing; and these and other patterns are formed in a manner similar to that described above.

Patterns R, S and T are angle patterns. These are simpler patterns which are actually parts of the above-described U and Z patterns, and are formed by the components as indicated on the drawings. Patterns V, W, X and Y are straight line patterns which, again, are merely parts of the above-discussed patterns, and are formed by the tools A and B, alone.

The above-discussed patterns are merely exemplary of the great variety of patterns which may be formed by the apparatus of the present invention.

What is claimed is:

1. In positioning apparatus:
   a supporting means; a plurality of working devices mounted on said supporting means, in juxtaposed relation for rectilinear movement relative to each other;
   drive means for moving one of said working devices on said supporting means; means for coupling the other of said working devices to said one driven working device; means for selectively disengaging said coupling means to uncouple selectively the other of said working devices from said driven working device; said drive means being operable, in cooperation with said disengaging means, to position said working devices selectively at separated positions on said supporting means;
   and a collapsing mechanism connected between certain of said working devices, selectively actuable to move said working devices toward each other to positions adjacent to each other; said mechanism being extended as a result of movement of said devices relatively away from each other.

2. In positioning apparatus:
   a supporting means; a plurality of working devices mounted on said supporting means, in juxtaposed relation for rectilinear movement relative to each other;

drive means for moving one of said working devices on said supporting means; means for coupling the other of said working devices to said one driven working device and to each other in a trainlike relationship; means for selectively disengaging said coupling means to uncouple selectively the other of said working devices from said driven working device; said drive means being operable, in cooperation with said disengaging means, to position said working devices selectively at separated positions on said supporting means;

and a collapsing mechanism connected between the outermost of said working devices, selectively actuable to move said working devices toward each other into contiguous relation; said mechanism being extended as a result of movement of said devices to separated positions on said supporting means.

3. In positioning apparatus:
a supporting means; a plurality of working devices mounted on said supporting means, in juxtaposed relation for rectilinear movement relative to each other;

drive means for moving one of said working devices on said supporting means; means for coupling said working devices to each other in a grouped trainlike relation, for movement as a group by said drive means; means for selectively disengaging said coupling means to uncouple said working devices from said one driven working device; said drive means being operable, in cooperation with said disengaging means, to position said working devices selectively at separated positions on said supporting means;

and a collapsing mechanism connected between said driven working device and the working device furthest therefrom, selectively actuable to move said working devices toward each other into said grouped relation; said mechanism being extended as a result of movement of said devices relatively away from each other.

4. In positioning apparatus:
a frame; a plurality of carriers mounted in juxtaposed relation for rectilinear movement relative to each other on said frame;

drive means for moving one of said carriers; means for coupling the other of said carriers to said one driven carrier for movement therewith; means for selectively disengaging said coupling means to uncouple selected carriers from said driven carrier; said drive means being operable, in cooperation with said disengaging means, to position said carriers selecectively at separated positions on said frame;

a group of a plurality of carriages mounted in juxtaposed relation for rectilinear movement relative to each other on each of said carriers; drive means for moving one of said carriages, in each of said groups; means for coupling the other of said carriages, of respective groups, to said one driven carriage for movement therewith; means for selectively disengaging said carriage coupling means to uncouple selected carriages from their respective driven carriages; said carriage drive means being operable, in cooperation with said carriage disengaging means, to position said carriages selectively at separated positions on said carriers;

a collapsing mechanism connected between the outermost of said carriers for moving said carriers to positions contiguous to each other; a collapsing mechanism connected between the outermost of said carriages, in each of said groups of said carriages, for moving the respective carriages to positions contiguous to each other; and each of said collapsing mechanisms being extended as a result of movement of respective members relatively away from each other.

5. In positioning apparatus:
a frame having an elongated guide track; a plurality of carriers mounted in juxtaposed relation for rectilinear movement on said guide track;

drive means for moving one of said carriers; means for coupling the other of said carriers to said one driven carrier for movement therewith in a trainlike relation; means for selectively disengaging said coupling means to uncouple selected carriers from said driven carrier; said drive means being operable, in cooperation with said disengaging means, to position said carriers selectively at separated positions on said guide track;

each of said carriers having an elongated guide track; a group of a plurality of carriages mounted in juxtaposed relation for rectilinear movement on the guide tracks of each of said carriers; drive means for moving one of said carriages, in each of said groups; means for coupling the other of said carriages, of respective groups, to said one driven carriage for movement therewith in a trainlike relation; means for selectively disengaging said carriage coupling means to uncouple selected carriages from their respective driven carriages; said carriage drive means being operable, in cooperation with said carriage disengaging means, to position said carriages selectively at separated positions on said guide track;

a collapsing mechanism connected between the outermost of said carriers; a collapsing mechanism connected between the outermost of said carriages, in each of said groups of said carriages; each of said collapsing mechanisms being extended as a result of the movement of respective members relatively away from each other; and each of said callapsing mechanisms being actuable to assemble the respective members into said trainlike relation.

6. The invention set forth in claim 5 wherein each of said carriages includes a wire working device.

7. In wire positioning apparatus:
a frame having an elongated guide track;
a driving carrier and a driven carrier mounted adjacent to each other, on said guide track, for rectilinear movement; said carriers each including an elongated guide track disposed transversely of said frame guide track; drive means for moving said driving carrier; means for coupling said driven carrier to said driving carrier for movement with the latter;

first, second and third wire working devices mounted, in a trainlike relation, on the guide track of said driving carrier for rectilinear movement; drive means for moving said first device; means for coupling said second device to said first device, and said third device to said second device, for movement with said first device;

fourth, fifth and sixth wire working devices mounted, in a train-like relation, on the guide track of said driven carrier for rectilinear movement; drive means for moving said fourth device; means for coupling said fifth device to said fourth device, and said sixth device to said fifth device, for movement with said fourth device;

means for selectively disengaging said coupling means; said drive means being operable, in cooperation with respective disengaging means, to position said carriers and said devices selectively at separated positions on the respective guide tracks;

a collapsing mechanism connected between said driving and driven carriers; a collapsing mechanism connected between said first and third devices; and a collapsing mechanism connected between said fourth and sixth devices; said collapsing mechanisms being extended during relative separating movement of respective carriers and devices; and means for actuating said collapsing mechanisms to move the respective carriers and devices toward each other into contiguous relation on the respective guide tracks.

8. In positioning apparatus:
a frame having elongated slide rods;
a driving carrier and a driven carrier mounted adjacent to each other for rectilinear movement on said frame slide rods; said carriers each including elongated slide rods disposed transversely of said frame slide rods; drive means for moving said driving carrier; means for coupling said driven carrier to said driving carrier for movement with the latter;
a first driving carriage and first and second driven carriages mounted in juxtaposed relation for rectilinear movement on the slide rods of said driving carrier; drive means for moving said first driving carriage; means for coupling said first driven carriage to said first driving carriage, and said second driven carriage to said first driven carriage, for movement with said first driving carriage;
a second driving carriage and third and fourth driven carriages mounted in juxtaposed relation for rectilinear movement on the slide rods of said driven carrier; drive means for moving said second driving carriage; means for coupling said third driven carriage to said second driving carriage, and said fourth driven carriage to said third driven carriage, for movement with said second driving carriage;
means for selectively disengaging said coupling means; said drive means being operable, in cooperation with respective disengaging means, to selectively position said carriers and said carriages at separated positions on the respective slide rods;
a cylinder assembly connected between said driving and driven carriers; a cylinder assembly connected between said first driving carriage and said second driven carriage; a cylinder assembly connected between said second driving carriage and said fourth driven carriage; said cylinder assemblies being extended during relative separating movement of respective carriers and carriages; and means for actuating said cylinder assemblies being collapsible to move the respective carriers and carriages into contiguous relation on the respective slide rods.

9. The invention set forth in claim 8 wherein each of said carriages is provided with a wire working element; wherein said wire working elements of said first and third driven carriages include means for suspending a wire therebetween; wherein said wire working elements of said first and second driving carriages and said second and fourth driven carriages each include means for selectively engaging said suspended wire; and wherein said carriers and carriages are collapsed by said cylinder assemblies to position said wire suspending elements initially adjacent to each other.

10. The invention set forth in claim 8 including a wire engaging element mounted on each of said carriages, disposed in a plane parallel to said slide rods; wherein the relative movements of said wire engaging elements, with their respective carriages, define a wire pattern in said plane.

References Cited by the Examiner
UNITED STATES PATENTS
3,019,822  2/62  Jacobson _____ 242—7

CHARLES W. LANHAM, *Primary Examiner.*
HARRISON R. MOSELEY, *Examiner.*